United States Patent

[11] 3,604,634

| [72] | Inventor | William Windle<br>St. Austell, Cornwall, England |
|---|---|---|
| [21] | Appl. No. | 871,963 |
| [22] | Filed | Oct. 28, 1969 |
| [45] | Patented | Sept. 14, 1971 |
| [73] | Assignee | English Clays Lovering Pochin &<br>Company, Limited<br>Cornwall, England |
| [32] | Priority | Dec. 23, 1965, Mar. 18, 1969, Sept. 23, 1969 |
| [33] | | Great Britain |
| [31] | | 54749/65, 14279/69 and 46824/69<br>Continuation-in-part of application Ser. No. 603,447, Dec. 21, 1966, now abandoned. |

[54] COMMINUTION OF SOLID MATERIALS
13 Claims, No Drawings

[52] U.S. Cl. ............................................. 241/16, 241/30
[51] Int. Cl. ........................................... B02c 17/00, B02c 23/06
[50] Field of Search ......................................... 241/16, 21, 30, DIG. 12

[56] References Cited

UNITED STATES PATENTS

| 2,203,809 | 6/1940 | Bechtold .................... | 241/16 X |
| 2,225,147 | 12/1940 | Bechtold .................... | 241/16 X |
| 2,225,149 | 12/1940 | Bechtold .................... | 241/16 X |
| 2,668,749 | 2/1954 | McHan ....................... | 241/16 X |
| 3,068,110 | 12/1962 | Fagerholt .................... | 241/16 X |
| 1,328,299 | 1/1920 | Ryan .......................... | 241/21 |

*Primary Examiner*—Donald G. Kelly
*Attorney*—Cushman, Darby & Cushman

ABSTRACT: A method of grinding calcium carbonate minerals, e.g. chalk, calcite and marble, in order to obtain a pigment suitable for use in paper coating compositions. The mineral is ground in aqueous suspension using a particulate grinding material, and the amount of mineral in the aqueous suspension, the size of the particulate grinding material, the relative proportions of the mineral, the aqueous suspension and the grinding material, and the duration of the grinding are adjusted to be within specified ranges in order to ensure that a pigment have the desired properties is obtained.

COMMINUTION OF SOLID MATERIALS

This application is a continuation-in-part of my application Ser. No. 603,447 filed Dec. 21, 1966, now abandoned.

BACKGROUND OF THE INVENTION

This invention relates to the comminution of calcium carbonate minerals. Calcium carbonate minerals, for example calcite, chalk and marble, have nonsheet crystal structures, are mined in large quantities and are used for many purposes, e.g. as fillers or pigments, in, for example, the paint, ceramic, plastics and paper industries.

It is known to grind calcium carbonate minerals in a pebble mill, where necessary after a preliminary crushing process, in order to reduce the size of the particles constituting the mineral. However, the product obtained at the end of conventional grinding processes has a brightness, when measured as the percentage reflectance to light of 458 millimicrons wavelength, of about 85 percent and contains from about 25 percent to about 35 percent by weight of particles smaller than 2 microns equivalent spherical diameter and less than 1 percent by weight of particles smaller than 0.5 microns equivalent spherical diameter. While suitable for many of the purposes outlined above, this product is normally not sufficiently bright or composed of sufficiently small particles to enable it to be used as a pigment in paper coating compositions; for example, he gloss of a sheet of paper coated with a paper coating composition using such a product as pigment is, using one of the conventional adhesive systems, of the order of 10 TAPPI gloss units. In general, therefore, calcium carbonate pigment for use in paper coating compositions is presently obtained by chemical precipitation processes which provide a much brighter and finer product.

SUMMARY OF THE INVENTION

Surprisingly, it has now been found that it is possible to grind calcium carbonate minerals, for example chalk, economically in a way such as to result in a product which is finer and has improved brightness as compared with the product obtained by known grinding methods, whilst at the same time maintaining the desirable low adhesive demand (i.e. only a small amount of adhesive, such as starch or casein, is required to hold the chalk whiting onto a sheet of paper), oil absorption and rheological properties of conventional commercially obtainable chalk pigments.

More particularly, in accordance with the present invention there is provided a method of grinding a calcium carbonate mineral which comprises the steps of (a) forming an aqueous suspension comprising at least 25 percent by weight of said calcium carbonate mineral, and (b) grinding said aqueous suspension of calcium carbonate mineral with a particulate grinding material, wherein the particulate grinding material consists of particles ranging in size from 150 microns to ¼ inch and the quantity thereof used is such that the volume occupied by the particulate grinding material is at least one-half of the volume of the aqueous suspension of calcium carbonate mineral and wherein the aqueous suspension is ground for a time sufficient to dissipate therein at least 250 horsepower hours of energy per ton of dry calcium carbonate mineral.

The calcium carbonate mineral which is ground by the particulate grinding material should preferably not include any particles larger than a No. 8 mesh B.S. sieve and, if necessary, should be comminuted, for example by being subjected to a crushing or coarse grinding process, and sieved before being treated by the method of the invention.

The ground calcium carbonate mineral, which is obtained by the method of the invention, will generally contain at least 70 percent by weight of particles smaller than 2 microns equivalent spherical diameter and at least 15 percent by weight of particles smaller than 0.5 microns equivalent spherical diameter. Moreover, a sheet of paper coated with a paper coating composition comprising the product of the present invention and a conventional adhesive system will have a gloss of at least 25 TAPPI gloss units.

DESCRIPTION OF THE PREFERRED EMBODIMENTS

The aqueous suspension of the calcium carbonate mineral preferably contains a water-soluble nonmucilaginous dispersing agent. When the aqueous suspension of calcium carbonate mineral contains such a dispersing agent there can be present in the suspension up to about 75 percent by weight of the calcium carbonate mineral and there is preferably present at least 40 percent by weight of the calcium carbonate mineral. Preferred nonmucilaginous dispersing agents for use in the present invention are water-soluble salts having macromolecular anions with an average molecular weight in the range 100 to 10,000 and most preferably are water-soluble salts having organic polymeric anions with an average molecular weight in the range 100 to 10,000 for example the sodium, potassium and ammonium salts of polyacrylic acids and of polymethacrylic acids, such as that sold under the Trade Mark DISPEX. Other water-soluble nonmucilaginous dispersing agents which have macromolecular anions with an average molecular weight in the range 100 to 10,000 and which can be used in the method of the invention include water-soluble salts of polyphosphoric acids, water-soluble salts of polysilicic acids, and water-soluble dinaphthylmethanesulphonates, lignosulphonates and alginates. The amount of such dispersing agents required will generally lie in the range of from 0.05 to 0.60 percent by weight, based on the weight of dry calcium carbonate mineral. If the aqueous suspension of the calcium carbonate mineral does not contain a dispersing agent, or contains less than 0.05 percent by weight of dispersing agent, then there can be present in the suspension up to about 40 percent by weight of the calcium carbonate mineral.

The particulate grinding material should consist of particles ranging in size from 150 microns (No. 100 mesh B.S. sieve) to ¼ inch in diameter, preferably from 500 microns (No. 30 mesh B.S. sieve) to 2 mm. (No. 8 mesh B.S. sieve) in diameter. In order to obtain good results it is important that the size of the particles making up the grinding material should be in the specified range. The amount of particulate grinding material used should be such that the volume thereof is at least equal to one-half of the volume of the aqueous suspension of calcium carbonate mineral. Preferably, the quantity of particulate grinding material used is such that the volume occupied thereby is not more than 1½ times the volume of the aqueous suspension of calcium carbonate mineral. It is also advantageous if the weight ratio of the particulate grinding material to the calcium carbonate mineral is in the range of from 2:1 to 5:1. Examples of materials which can form the particulate grinding material include silica sand, e.g. Ottawa sand, a calcined clay e.g. that known under the Trade Name MOLOCHITE, granules of flint, a ceramic material or a glass, or granules of a synthetic polymeric material, for example nylon.

The grinding of the calcium carbonate mineral in the aqueous suspension should be carried out for a time such that there is dissipated in the aqueous suspension at least 250 horsepower hours of energy per ton of dry calcium carbonate mineral. Generally, the amount of energy dissipated in the aqueous suspension will not exceed 500 horsepower hours, or at most 1,000 horsepower hours, per ton of dry calcium carbonate mineral. The grinding can be carried out in any suitable vessel but preferably is carried out in a sand grinding mill.

The invention is illustrated by the following examples.

EXAMPLE 1

There was prepared a mixture consisting of the following ingredients:

| | |
|---|---|
| Coarsely ground chalk whiting | 1,000 g. |
| MOLOCHITE (−10 to + 30 B.S. mesh) | 4,000 g. |
| Water | 1,500 cc. |
| DISPEX | 2 g. | and this mixture was introduced into a ball mill using a Linatex-lined cylinder of 6.6 liters capacity rotating at 61 r.p.m. on rollers. The volume occupied by the MOLOCHITE, i.e. by the particulate grinding material, was 1,540 ml. and that occupied by the aqueous suspension of chalk was 1,880 ml. i.e. a volume ratio of 0.82:1. Samples were withdrawn from the cylinder for testing after 2, 4, 8 and 16 hours, and tested for particle size and brightness. The following results were obtained:

Table 1A

| Grinding Time (hrs.) | Energy input (hp.-hr. per ton of dry chalk) | Particle size % by weight <2μ | Particle size % by weight <0.5μ | % Reflectance to violet light having a wavelength of 458 mμ |
| --- | --- | --- | --- | --- |
| 0 | 0 | 35 | 0.1 | 85.6% |
| 2 | 26 | 54 | 12.0 | 86.8% |
| 4 | 55 | 70 | 20.0 | 88.6% |
| 8 | 120 | 86 | 23.0 | 89.8% |
| 16 | 284 | 97 | 32.0 | 89.9% |

An attempt was made to repeat the foregoing procedure without the use of the DISPEX dispersing agent but it was found that, at the high solids content used, no effective grinding of the chalk whiting occurred due to the high viscosity of the contents of the ball mill. In addition, no change in the percentage reflectance of the chalk whiting to violet light of 458 millimicrons wavelength could be observed.

The optical properties, viz. the gloss, of a sheet of paper coated with a paper coating composition incorporating the chalk whiting as pigment were measured by coating a suitable base paper with the paper-coating composition on a laboratory scale trailing blade coater of the type described in U.S. Pat. No. 3,416,943 and measuring the gloss of the coated paper by the procedure specified in TAPPI Standard No. T480 ts—65 (Tentative standard—1951; Revised—1965), the gloss being expressed in TAPPI gloss units with the value of 100 TAPPI gloss units being assigned to a clean polished glass of refractive index 1.540 as measured for the sodium D-line. The base paper used had a weight of 81 grams per square meter and the coating composition comprised 100 parts by weight of the pigment, 10 parts by weight of KCOSOL 310 starch and 10 parts by weight of Dow 636 latex and sufficient water to give a solids content of 63 percent by weight. The coating composition also contained 0.3 percent by weight, based on the weight of chalk whiting, of a sodium polyacrylate dispersing agent. The coated sheets were conditioned at 68° F. and at 65 percent relative humidity and then calendered for 10 passes at a temperature of 85° C. and a line pressure of 250 lb. per linear inch, the peripheral speed of the calendar rolls being 120 feet per minute. Finally the calendered sheets were conditioned again at 68° F. and 65 percent relative humidity.

The procedure was carried out for a series of different energy inputs in the grinding of the chalk whiting and the results obtained are shown in table IB below:

Table IB

| Grinding Time (hrs.) | Energy input (hp.-hr. per ton of dry chalk) | Gloss of coated sheets (TAPPI gloss units) |
| --- | --- | --- |
| 0 | 0 | 10.1 |
| 2 | 26 | 11.5 |
| 4 | 55 | 13.8 |
| 8 | 120 | 18.5 |
| 16 | 284 | 30.2 |

EXAMPLE 2

A batch of raw chalk whiting was coarsely ground to remove flint impurities. The grinding was carried out for 15 minutes on an aqueous suspension containing 70 percent by weight of the dry chalk whiting and 0.25 percent by weight of a sodium polyacrylate dispersing agent based on the weight of dry whiting. After the coarse grinding had been completed, the aqueous suspension was screened to remove all particles larger than 53 microns.

A sample of the flint-free aqueous suspension of chalk whiting containing 20 lb. of dry chalk whiting, corresponding to a chalk whiting solids concentration of 70 percent by weight, was loaded into a sand grinding mill together with 46 lb. of Ottawa sand consisting of particles ranging in size from 500 microns to 2 mm. The volume occupied by the aqueous chalk whiting suspension was 1.62 gallons and that occupied by the Ottawa sand 1.77 gallons, i.e. a volume ration of 0.92, and the weight ratio of the Ottawa sand to chalk whiting was 2:3:1.

The mixture of aqueous suspension and particulate grinding material was agitated in the sand-grinding mill for a time sufficient to dissipate in the aqueous suspension the required amount of energy, after which time the chalk whiting suspension was separated from the sand by screening, flocculated with a polyacrylamide flocculating agent, filtered and the chalk-whiting dried in an oven at 80° C.

The weight fractions of the ground chalk-whiting consisting of particles smaller than 2 microns and smaller than 0.5 microns equivalent spherical diameter were measured. Similarly, using the procedure described in example 1 the gloss of paper coated with a paper-coating composition employing as pigment the ground chalk whiting was measured. The results obtained are given in table II below:

Table II

| Energy input (hp.-hr. per 1,080 of dry chalk whiting) | Particle Size % by weight <2μ | Particle Size % by weight <0.5μ | Gloss of coated sheet (TAPPI gloss units) |
| --- | --- | --- | --- |
| 0 | 32 | 2 | 12.0 |
| 29 | 42 | 3 | 13.8 |
| 65 | 49 | 6 | 15.5 |
| 155 | 65 | 18 | 20.0 |
| 240 | 80 | 20 | 27.0 |
| 310 | 92 | 27 | 31.5 |
| 460 | 100 | 37 | 34.0 |
| 640 | 100 | 49 | 36.5 |
| 850 | 100 | 65 | 37.5 |
| 1,080 | 100 | 77 | 37.6 |
| 1,200 | 100 | 86 | 37.6 |

EXAMPLE 3

Forty pounds of Italian marble in the form of approximately ¼–½inch lumps were dry ground in a rubber-lined pebble mill approximately half full of 2–3 inch flint pebbles for a total time of 7 hours 5 minutes. The ground product was then screened through a No. 16 mesh B.S. sieve.

The coarse ground and sieved marble was then subjected to a further grinding process in accordance with the method of the invention using a particulate grinding material comprising a silica sand from Leighton Buzzard, Bedfordshire, England consisting of substantially spherical particles ranging in size from No. 16 mesh B.S. sieve to No. 30 mesh B.S. sieve. The process was carried out in a sand grinding mill. The mixture in the sand grinding mill comprised 5.0 kg. of dry marble, 10.0 kg. of sand, 2.138 liters of water and 0.3 percent by weight, based on the weight of the dry marble, of an ammonium polyacrylate dispersing agent. The ratio of the volume occupied by the sand to that of the aqueous suspension of marble was 0.94:1, and the solids content of the aqueous suspension of marble was 70 percent by weight of dry marble. The weight ratio of particulate grinding material to calcium carbonate mineral was 2:1. Three samples of the marble were ground with the sand in this manner for differing lengths of time so that different quantities of energy were dissipated in the suspensions.

Each of the three samples of ground marble was screened through a No. 300 mesh B.S. sieve and then dried in a conventional spray drier. The weight fractions of each sample of ground marble consisting of particles smaller than 2 microns and smaller than 0.5 microns equivalent spherical diameter (e.s.d.) were measured.

Each sample was then incorporated into a paper coating composition comprising 50 parts by weight of the dry marble, 50 parts by weight of a dry china clay having a particle size distribution such that 80 percent by weight thereof consisted of particles smaller than 2 microns e.s.d., 7½ parts by weight of VISCOSOL 310 starch and 7½ parts by weight of a styrene-butadiene rubber latex, viz. Dow latex 636. The composition contained that quantity of water which gave a total solids content of 63 percent by weight, there being dissolved in the water 0.3 percent by weight, based on the weight of dry china clay, of ammonium polyacrylate dispersing agent, to deflocculate china clay. Each composition was coated on to a base paper having a weight of 81 grams per square meter at a coating weight of 10 grams per square meter by means of a laboratory scale trailing blade coater of the type described in U.S. Pat. No. 3,416,943. The coated sheets were conditioned at 68° F. and at 65 percent relative humidity and then calendered for 10 passes at a temperature of 85° C. and a line pressure of 250 lb. per linear inch, the peripheral speed of the calendar roll being 120 feet per min. Finally, the calendered sheets were conditioned again at 68° F. and 65 percent relative humidity, and the gloss of the coated paper sheets were measured by the procedure specified in TAPPI Standard No. T 480 ts-65. The results obtained are shown in table III below.

Table III

| Energy input (hp.-hr. per ton of dry marble) | Particle size % by weight <2μ | % by weight <0.5μ | Gloss of coated paper sheet (TAPPI (TAPPI gloss |
| --- | --- | --- | --- |
| 186 | 63 | 14 | 36.2 |
| 250 | 72 | 19 | 43.0 |
| 350 | 87 | 25 | 43.8 |

EXAMPLE 4

Calcite from Flintshire, Wales comprising lumps of up to about 6 inches in size was washed, crushed in a jaw crusher down to a size of ¼–½ inch and dried. Any obviously discolored particles were removed by hand the remainder dry ground in a pebble mill half filled with 2—3 inch pebbles. Each charge of the pebble mill comprised 40 lb. of dry calcite which was ground for a time of 2 hours 5 minutes and then screened through a No. 52 mesh B.S. sieve.

Four batches of the pebble milled calcite were then subjected to a further grinding process in a sand-grinding mill in accordance with the method of the invention, using as a particulate grinding material Leighton Buzzard silica sand consisting of particles ranging in size from No. 16 mesh B.S. sieve to No. 30 mesh B.S. sieve. Each batch comprised 5.0 kg. of dry calcite, 10.0 kg. of sand, 2.138 liters of water and 0.3 percent by weight, based on the weight of dry calcite, of an ammonium polyacrylate dispersing agent. The weight ratio of particulate grinding material to calcium carbonate mineral was 2:1, and the volume ratio of the grinding material to the aqueous suspension of the calcium carbonate mineral was 0.94:1. The four batches were ground for different lengths of time so that the amount of energy dissipated in the suspensions was different in each case.

At the completion of the grinding of each batch the mixture was screened through a No. 300 mesh B.S. sieve and dried in a conventional spray drier. The percentages by weight of particles smaller than 2 microns and smaller than 0.5 micron e.s.d. were measured, and the gloss of a sheet of paper coated with a paper coating composition comprising the calcite and the same china clay as used in example 3 was then determined exactly as described in example 3. The results obtained are shown in table IV below.

Table IV

| Energy input (hp.-hr. per ton of dry calcite) | Particle size % by weight <2μ | % by weight <0.5μ | Gloss of coated sheet (TAPPI gloss units) |
| --- | --- | --- | --- |
| 165 | 67 | 16 | 36.0 |
| 230 | 78 | 22 | 44.5 |
| 314 | 93 | 27 | 46.9 |
| 430 | 99 | 35 | 47.6 |

EXAMPLE 5

Three batches of a Wiltshire, England flint-free chalk whiting having a particle size distribution such that 31 percent by weight consisted of particles smaller than 2 microns e.s.d. were ground in accordance with the method of the invention in a sand-grinding mill in the absence of any dispersing agent, using as the particulate grinding material silica sand from Leighton Buzzard consisting of particles ranging in size from No. 16 mesh B.S. sieve to No. 30 mesh B.S. sieve. Each batch comprised 2.9 kg. of chalk whiting, 12 kg. of sand and 7.94 liters of water. The solids content of the aqueous suspension of chalk whiting was thus 26.8 percent by weight of dry chalk whiting and the ratio of the volume occupied by the sand to the volume of the aqueous suspension of marble was 0.51:1. The weight ratio of the particulate grinding material to calcium carbonate mineral was 4.1:1. The three batches were ground for different lengths of time so that the amount of energy dissipated in the suspensions was different in each case.

At the completion of the grinding of each batch the mixture was screened through a No. 300 mesh B.S. sieve and the suspension thickened to a stiff paste in a solid bowl centrifuge. The centrifuge cake was then mixed with 0.3 percent by weight, based on the weight of dry chalk whiting, of an ammonium polyacrylate dispersing agent and the resultant deflocculated suspension was dried in a conventional spray drier. The percentages by weight of particles smaller than 2 microns and smaller than 0.5 micron e.s.d. and the gloss of a sheet of paper coated with a paper-coating composition comprising the chalk whiting and a china clay in equal proportions by weight were then deter mined exactly as described in example 3. The results obtained are shown in table V below.

Table V

| Energy input (hp.-hr. per ton of dry chalk whithing) | Particle size % by weight <2μ | % by weight <0.5μ | Gloss of coated sheet (TAPPI gloss units) |
| --- | --- | --- | --- |
| 100 | 55 | 9 | 34.1 |
| 290 | 89 | 25 | 43.9 |
| 600 | 100 | 42 | 46.5 |

I claim:

1. A method of grinding the calcium carbonate mineral which comprises the steps of (a) forming an aqueous suspension containing at least 25 percent by weight of said calcium carbonate mineral, and (b) grinding said aqueous suspension of calcium carbonate mineral with a particulate grinding material, wherein the particulate grinding material consists of particles ranging in size from 150 microns to ¼ inch and he quantity thereof used is such that the volume occupied by the particulate grinding material is at least one-half of the volume of the aqueous suspension of calcium carbonate mineral and wherein the aqueous suspension is ground for a time sufficient to dissipate therein at least 250 horsepower hours of energy per ton of dry calcium carbonate mineral.

2. A method according to claim 1, wherein said particulate grinding material consists of particles ranging in size from 500 microns to 2 mm. in diameter.

3. A method according to claim 1, wherein said aqueous suspension contains from 40 percent to 75 percent by weight of said calcium carbonate mineral and further contains a water-soluble nonmucilaginous dispersing agent which is a salt having a macromolecular anion with an average molecular weight in the range 100 to 10,000.

4. A method according to claim 3, wherein said water-soluble nonmucilaginous dispersing agent is selected from the group consisting of the sodium, potassium and ammonium salts of polyacrylic acids and polymethacrylic acids.

5. A method of grinding a calcium carbonate mineral which comprises the steps of (a) forming an aqueous suspension containing at least 25 percent by weight of said calcium carbonate mineral, and (b) grinding said aqueous suspension of calcium carbonate mineral with a particulate grinding material, wherein the particulate grinding material consists of particles ranging in size from 150 microns to ¼ inch and the quantity thereof used is such that the weight ratio of the particulate grinding material to the calcium carbonate mineral is in the range of from 2:1 to 5:1 and wherein the aqueous suspension is ground for a time sufficient to dissipate therein at least 250 horsepower hours of energy per ton of dry calcium carbonate mineral.

6. A method according to claim 5, wherein said particulate grinding material consists of particles ranging in size from 500 microns to 2 mm. in diameter.

7. A method according to claim 5, wherein said aqueous suspension contains from 40 percent to 75 percent by weight of said calcium carbonate mineral and further contains a water-soluble nonmucilaginous dispersing agent which is a salt having a macromolecular anion with an average molecular weight in the range 100 to 10,000.

8. A method according to claim 7, wherein said water-soluble nonmucilaginous dispersing agent is selected from the group consisting of the sodium, potassium and ammonium salts of polyacrylic acids and polymethacrylic acids.

9. A method of grinding a calcium carbonate mineral which comprises the steps of (a) forming an aqueous suspension containing at least 25 percent by weight of said calcium carbonate mineral, and (b) grinding said aqueous suspension of said calcium carbonate mineral with a particulate grinding material, wherein the particulate grinding material consists of particles ranging in size from 150 microns to ¼ inch and the quantity thereof used is such that the ratio of the volume occupied by the particulate grinding material to that occupied by the aqueous suspension of calcium carbonate mineral is in the range 0.5:1 to 1.5:1 and the weight ratio of the particulate grinding material to the calcium carbonate mineral is in the range of from 2:1 to 5:1 and wherein the aqueous suspension is ground for a time sufficient to dissipate therein at least 250 horsepower hours of energy per ton of dry calcium carbonate mineral.

10. A method according to claim 9, wherein said particulate grinding material consists of particles ranging in size from 500 microns to 2 mm. in diameter 11. A method according to claim 10, wherein said particulate grinding material is a silica sand.

12. A method according to claim 9, wherein said aqueous suspension contains from 40 percent to 75 percent by weight of said calcium carbonate mineral and further contains a water-soluble nonmucilaginous dispersing agent which is a salt having a macromolecular anion with an average molecular weight in the range of from 100 to 10,000.

13. A method according to claim 12, wherein said water-soluble nonmucilaginous dispersing agent is selected from the group consisting of the sodium, potassium and ammonium salts of polyacrylic acids and polymethacrylic acids.